United States Patent
Li et al.

(10) Patent No.: US 9,604,366 B2
(45) Date of Patent: Mar. 28, 2017

(54) MANIPULATOR GRIPPER FOR WORKPIECE AND FIXTURE

(71) Applicants: HONGFUJIN PRECISION ELECTRONICS (CHENGDU) Co., Ltd., Chengdu (CN); HON HAI PRECISION INDUSTRY CO., LTD., New Taipei (TW)

(72) Inventors: Shi-You Li, Shenzhen (CN); Jun-Ping Zhao, Shenzhen (CN)

(73) Assignees: HONGFUJIN PRECISION ELECTRONICS (CHENGDU) Co., Ltd., Chengdu (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/138,232

(22) Filed: Apr. 26, 2016

(65) Prior Publication Data

US 2016/0325438 A1    Nov. 10, 2016

(30) Foreign Application Priority Data

May 8, 2015    (CN) .................... 2015 2 0293428 U

(51) Int. Cl.
*B25J 15/00* (2006.01)
*B25J 15/06* (2006.01)

(52) U.S. Cl.
CPC ....... *B25J 15/0061* (2013.01); *B25J 15/0616* (2013.01); *Y10S 901/31* (2013.01); *Y10S 901/40* (2013.01)

(58) Field of Classification Search
CPC .................................................. B25J 15/0061
USPC ..... 294/82.51, 81.5, 81.54, 2, 81.3, 65, 183, 294/188, 189, 67.31, 106; 414/737, 414/752.1; 901/31, 40
See application file for complete search history.

(56) References Cited

U.S. PATENT DOCUMENTS

| 4,685,714 | A | * | 8/1987 | Hoke | B66C 1/0212 294/65 |
| 4,787,812 | A | * | 11/1988 | Gopfert | B66C 1/0212 294/188 |
| 5,024,575 | A | * | 6/1991 | Anderson | B65G 47/90 294/2 |
| 5,733,097 | A | * | 3/1998 | Herbermann | B21D 43/055 294/65 |
| 7,017,961 | B1 | * | 3/2006 | Parnell | B65G 47/91 294/188 |
| 7,134,833 | B2 | * | 11/2006 | de Koning | B65G 47/917 198/468.3 |

(Continued)

*Primary Examiner* — Paul T Chin
(74) *Attorney, Agent, or Firm* — Zhigang Ma

(57) ABSTRACT

A manipulator gripper configured for gripping workpieces and fixtures is provided. The manipulator gripper includes a mounting assembly, a suction assembly, and a clamping assembly coupled to the mounting assembly. The suction assembly includes a connecting arm coupled to the mounting assembly and at least one suction cup coupled to the connecting arm. The clamping assembly includes a pressing plate coupled to the mounting assembly, a driving member mounted on the pressing plate, two clamping members pivoting on opposing ends of the pressing plate, and two connecting rods. One end of each connecting rod pivots on the driving member, and the other end of each connecting rod pivots on one of the clamping members.

18 Claims, 6 Drawing Sheets

(56) References Cited

U.S. PATENT DOCUMENTS

| | | | | |
|---|---|---|---|---|
| 7,409,812 B2* | 8/2008 | Gilmore | ............... | B25J 15/0052 |
| | | | | 53/258 |
| 8,328,252 B2* | 12/2012 | Tonelli | ................... | A45C 13/26 |
| | | | | 294/119.1 |
| 8,414,042 B2* | 4/2013 | Landes | ................... | B65B 35/16 |
| | | | | 294/106 |
| 8,544,911 B2* | 10/2013 | Chen | ..................... | B25B 11/007 |
| | | | | 294/65 |

* cited by examiner

MANIPULATOR GRIPPER FOR WORKPIECE AND FIXTURE

FIELD

The subject matter herein generally relates to object handling, and particularly to a manipulator gripper mounted on a robot arm.

BACKGROUND

In sand blasting process, a workpiece is assembled to a fixture by a robot arm, and then the workpiece and the fixture are transported to a sand blasting apparatus. A suction assembly configured to grip the workpiece and a clamping assembly configured to clamp the fixture are positioned at two sides of the robot arm. After assembling the workpiece to the fixture, there is a need to turn the robot arm, and then the fixture with the workpiece can be clamped by the clamping assembly and transported by the robot arm.

BRIEF DESCRIPTION OF THE DRAWINGS

Implementations of the present technology will now be described, by way of example only, with reference to the attached figures.

DETAILED DESCRIPTION

Figure 1:
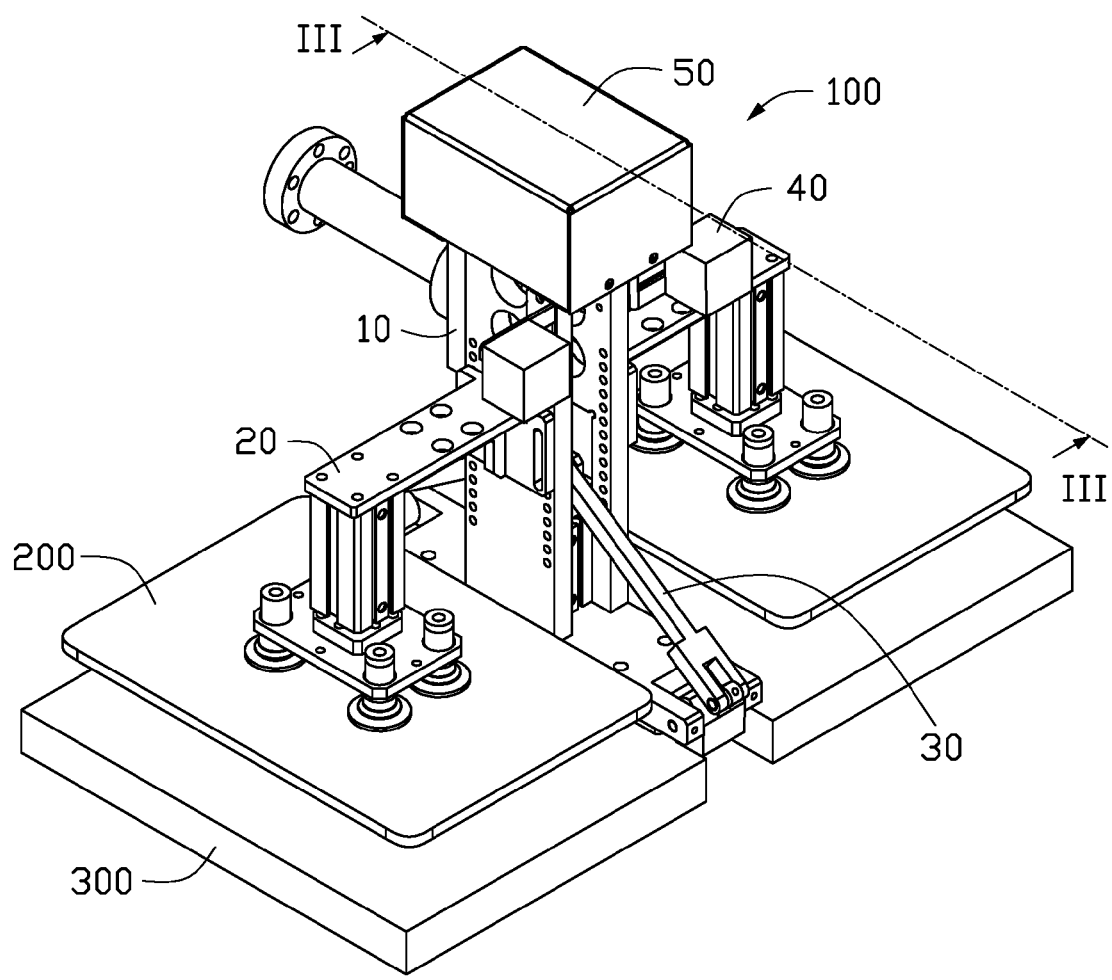
FIG. 1 is an isometric view of an embodiment of a manipulator gripper, a workpiece, and a fixture.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series and the like.

The present disclosure is described in relation to a manipulator gripper mounted on a robot arm. The manipulator gripper is configured for gripping and manipulating workpieces and fixtures.

FIG. 1 illustrates a manipulator gripper 100 configured for gripping a workpiece 200 and a fixture 300. The workpiece 200 can be assembled to the fixture 300. The manipulator gripper 100 can include a mounting assembly 10, at least one suction assembly 20, a clamping assembly 30, at least one pressure switch 40, and a cover 50. The at least one suction assembly 20 and the clamping assembly 30 can be mounted on the mounting assembly 10. In at least one embodiment, the manipulator gripper 100 can include two suction assemblies 20.

Figure 2:
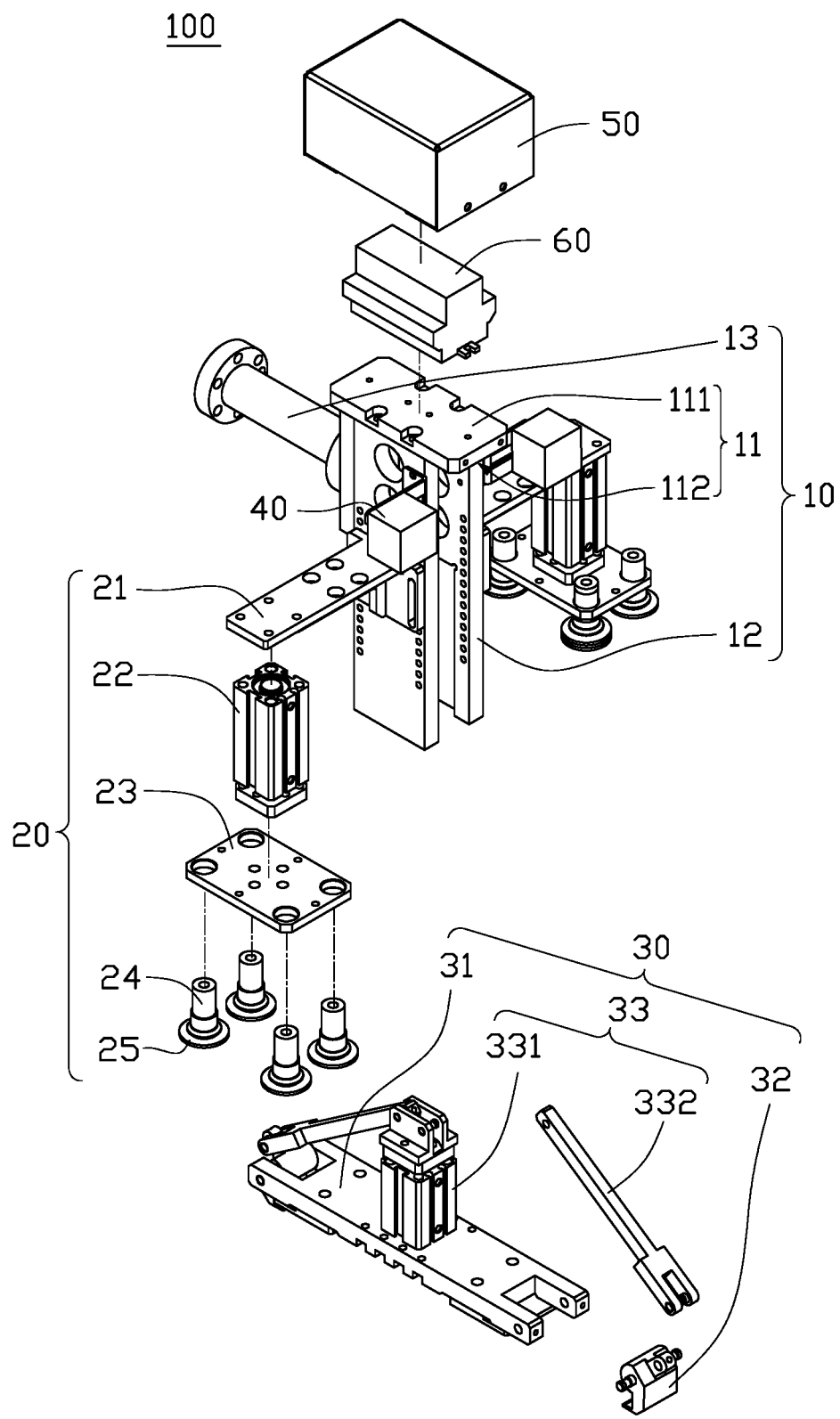
FIG. 2 is an exploded, isometric view of the manipulator gripper shown in FIG. 1.

FIG. 2 illustrates that the manipulator gripper 100 can further include a connecting terminal 60 received in the cover 50. The connecting terminal 60 can be electrically coupled to a control device (not shown) which controls the manipulator gripper 100.

The mounting assembly 10 can be substantially T-shaped and include a fixing plate 11, two side plates 12 extending perpendicularly from opposing sides of the fixing plate 11, and a connecting member 13 coupled to the two side plates 12. The fixing plate 11 can be substantially rectangular and include a first surface 111 and a second surface 112 opposite to the first surface 111. The connecting terminal 60 can be mounted on the first surface 111. The two side plates 12 can be coupled to the second surface 112. The cover 50 can cover the first surface 111. The connecting member 13 can be coupled to a robot arm (not shown).

Each suction assembly 20 can include a connecting arm 21, a suction driver 22, a fixing block 23 coupled to the suction driver 22, at least one connecting seat 24, and at least one suction cup 25. The connecting arm 21 can be fixed to the side plate 12, and the suction driver 22 can be coupled to one end of the connecting arm 21. The suction driver 22 can be configured to move the fixing block 23 toward or away from the connecting arm 21, thereby the position of the suction cup 25 can be adjusted. Two ends of each connecting seat 24 can be coupled to the fixing block 23 and the suction cup 25. The suction cup 25 can be coupled to a vacuum generator (not shown) via the connecting seat 24 and a vacuum pipe (not shown), and configured to grip the workpiece 200 by suction.

In at least one embodiment, the two suction assemblies 20 can be positioned at two sides of the fixing plate 11. Each suction assembly 20 can include four connecting seats 24 and four suction cups 25, and the four connecting seats 24 can be arranged evenly on the fixing block 23. The suction driver 22 can be a cylinder or a vacuum pump.

The clamping assembly 30 can include a pressing plate 31, two clamping members 32, and a driving subassembly 33. The pressing plate 31 can be substantially rectangular and coupled to the two side plates 12. The pressing plate 31 can be coupled to one end of the two side plates 12 away from the fixing plate 11 and can extend perpendicular to the connecting arm 21. The two clamping members 32 can pivot to opposing ends of the pressing plate 31. One of the clamping members 32 can pivot on a first end of the pressing plate 31, and the other clamping member 32 can pivot on a second end of the pressing plate 31. The driving subassembly 33 can include a driving member 331 and two connecting rods 332. The driving member 331 can be positioned between the two side plates 12 and mounted on the pressing plate 31. An end of one connecting rod 332 can pivot to the clamping member 32 and an other end of the connecting rod 332 can pivot to the driving member 331.

Figure 3:
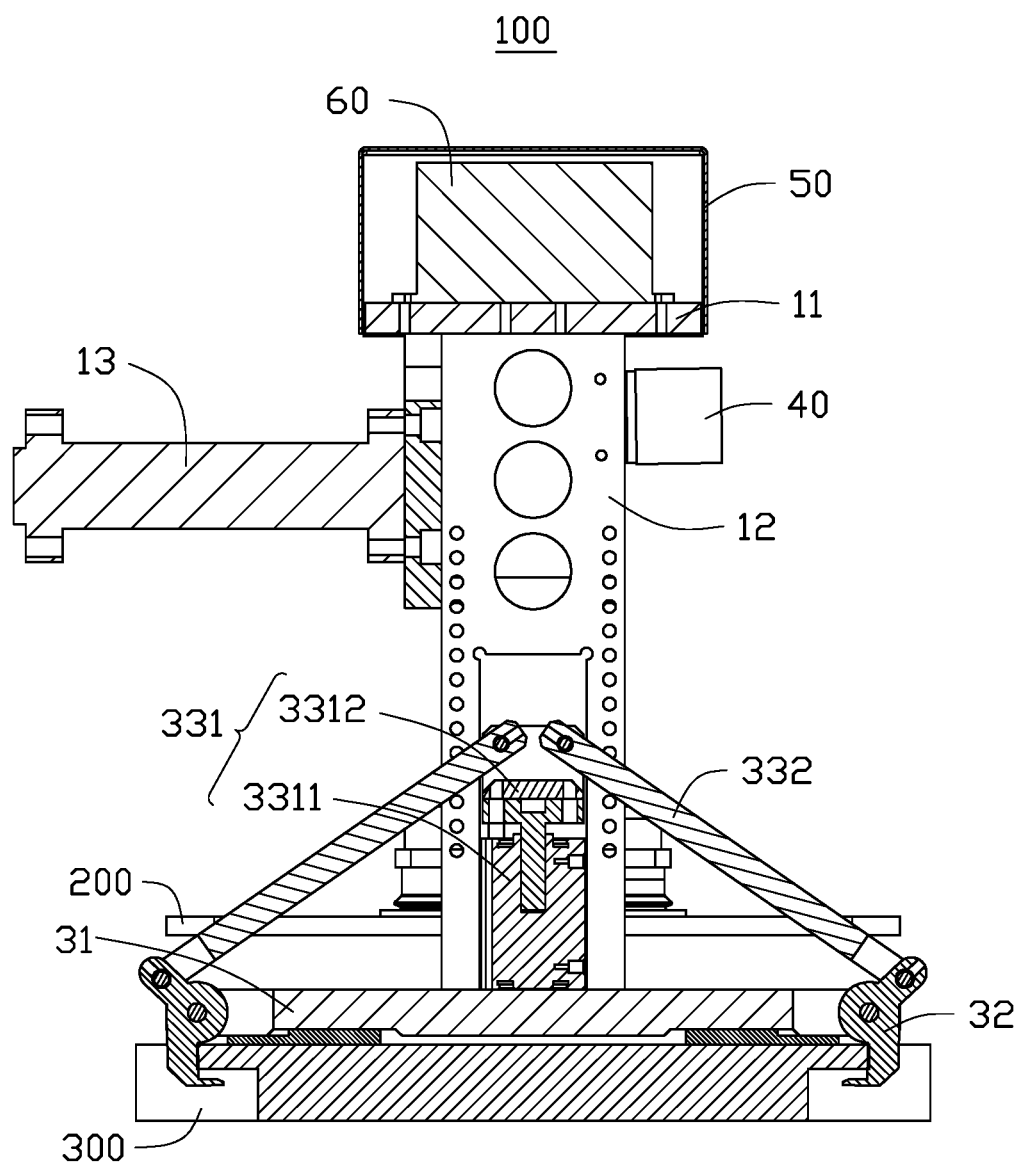
FIG. 3 is a cross-sectional view of the manipulator gripper of FIG. 1 taken along line III-III.

FIG. 3 illustrates that the driving member 331 can include a main body 3311 and a pivot member 3312 slidably coupled to the main body 3311. One end of each connecting rod 332 can pivot on one of the clamping members 32, and the other end of each connecting rod 332 can pivot on the pivot member 3312. The two clamping members 32 can rotate relative to the pressing plate 31. The two clamping members 32 can clamp or release the fixture 300 when driven by the driving member 331. In at least one embodiment, the driving member 331 can be, but is not limited to, a cylinder. The clamping members 32 can be, but are not limited to being, clasps.

The pressure switch 40 can be mounted on the side plate 12 and coupled to the vacuum generator and the suction cup 25. The pressure switch 40 can be configured to control the vacuum in the suction cups 25, thus the workpiece can be gripped by the suction cups 25.

Figure 4:
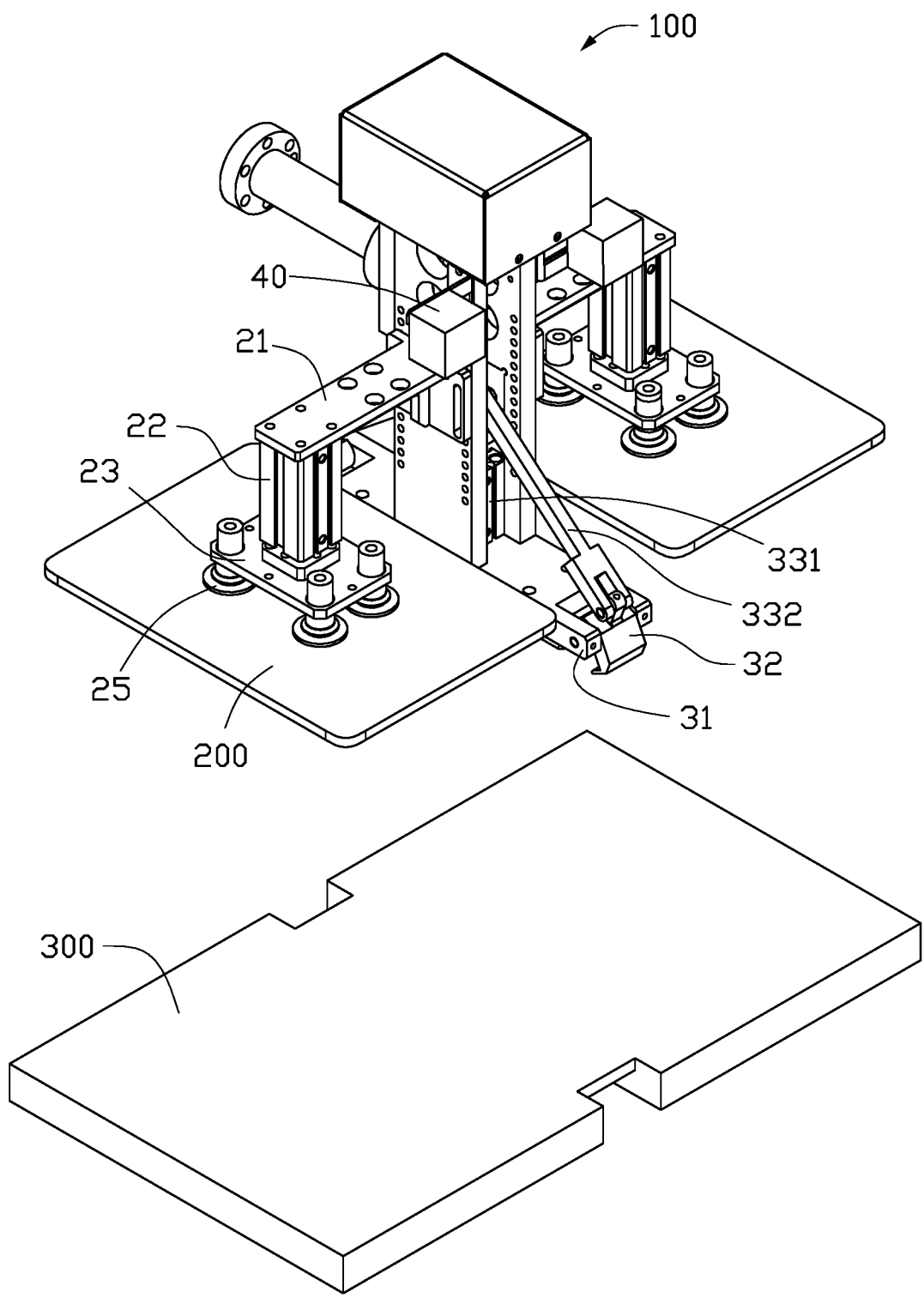
FIG. 4 is an isometric view of the manipulator gripper shown in FIG. 1 in a state of gripping the workpiece.

FIG. 4 illustrates the manipulator gripper 100 in a state of use. The manipulator gripper 100 can move to the top of two workpieces 200, and the suction driver 22 can move the fixing block 23 away from the connecting arm 21, thereby the suction cups 25 coupled to the fixing block 23 can be closely attached to surfaces of the workpieces 200. The vacuum generator can start, and the suction cups 25 can grip the workpieces 200 by suction.

Figure 5:
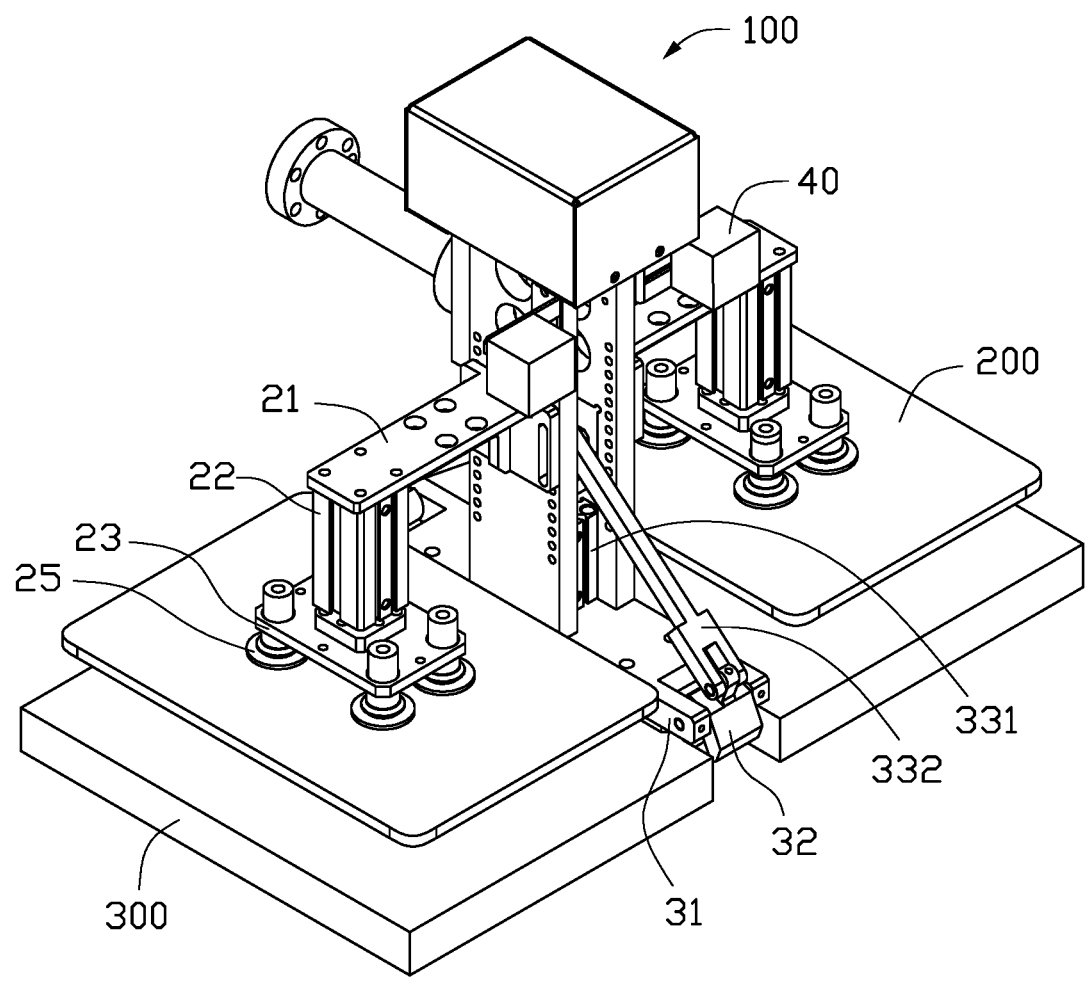
FIG. 5 is an isometric view of the manipulator gripper shown in FIG. 1 in a state of transferring the workpiece to the fixture.
Figure 6:
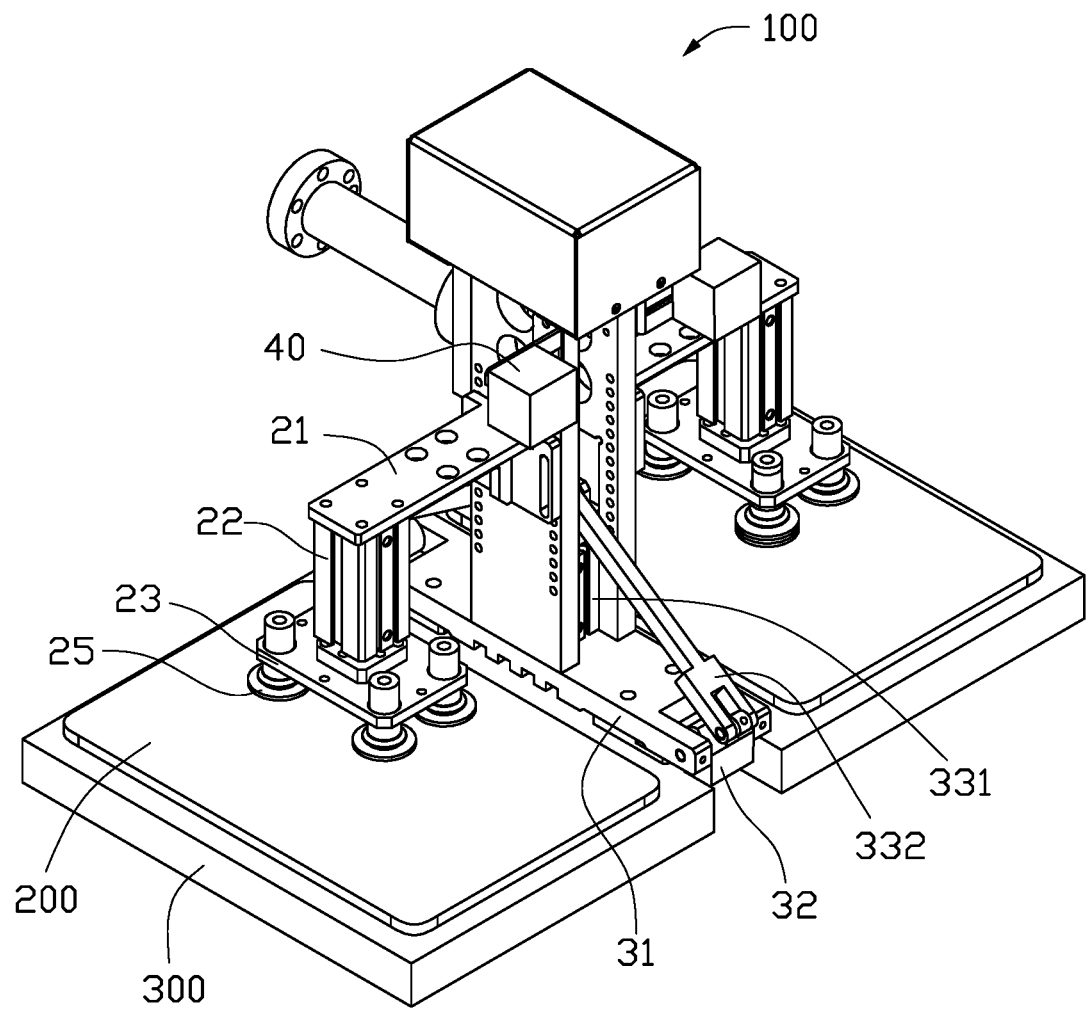
FIG. 6 is an isometric view of the manipulator gripper shown in FIG. 1 in a state of gripping the workpiece and the fixture.

FIG. 5 illustrates that the manipulator gripper 100 can transfer the workpieces 200 to the top of the fixture 300. FIG. 6 illustrates that the manipulator gripper 100 can assemble the workpieces 200 to the fixture 300. At this time, the pressing plate 31 can press the fixture 300. The driving member 331 can move the two connecting rods 332 away from the pressing plate 31, thus the clamping members 32 can rotate relative to the pressing plate 31, and two sides of the fixture 300 can be clamped tightly by the clamping members 32. The manipulator gripper 100 can then transfer the fixture 300 and the workpieces 200 to a processing mechanism (not shown), without turning the manipulator gripper 100. As the workpieces 200 are gripped by the suction assembly 20, and the fixture 300 can be clamped by the clamping assembly 30, the workpieces 200 and the fixture 300 will not fall or slip out when the manipulator gripper 100 moves.

When the driving member 331 moves the two connecting rods 332 toward the pressing plate 31, the connecting rods 332 can rotate the clamping members 32 and the clamping members 32 can release the fixture 300. When the vacuum generator is turned off, the suction cups 25 release the workpieces 200.

In at least one embodiment, each suction driver 22 can be coupled to one fixing block 23. In other embodiments, each suction driver 22 can be coupled to a plurality of fixing blocks 23.

In at least one embodiment, each suction assembly 20 can include a suction driver 22 configured for driving the fixing block 23. In other embodiments, each suction assembly 20 can include a plurality of suction drivers 22, each suction driver 22 can be coupled to a fixing block 23. At this time, each suction assembly 20 can grip a plurality of workpieces 200.

In other embodiments, the clamping assembly 30 can include the pressing plate 31, two driving members (not shown) coupled to the two ends of the pressing plate 31, and the clamping members 32 coupled to the two driving members, as long as the clamping members 32 can clamp or release the fixture 300 when driven by the driving members.

In other embodiments, the clamping assembly 30 can include two driving members and two clamping members coupled to the two driving members, and each driving member can be coupled to one end of the connecting arm.

The manipulator gripper 100 of this disclosure can include the suction assemblies 20 and the clamping assembly 30 mounted at the same side of the fixing plate 11. The manipulator gripper 100 need not be turned when transferring the workpieces 200 and the fixture 300, thus operation time and production cost can be saved.

The embodiments shown and described above are only examples. Many details are often found in the art such as the other features of a manipulator gripper. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A manipulator gripper configured for gripping and manipulating workpieces and fixtures, the manipulator gripper comprising:
    a mounting assembly, the mounting assembly comprising a fixing plate and two side plates, the two side plates extending perpendicularly from opposing sides of the fixing plate;
    a suction assembly comprising:
        a connecting arm coupled to the mounting assembly; and
        at least one suction cup coupled to the connecting arm and configured for gripping the workpiece by suction; and
    a clamping assembly comprising:
        a pressing plate coupled to the mounting assembly;
        a driving member mounted on the pressing plate;
        two clamping members, one of the clamping members pivoting on a first end of the pressing plate, and the other clamping member pivoting on a second end of the pressing plate, and
        two connecting rods, wherein one end of each connecting rod pivots on the driving member, and the other end of each connecting rod pivots on one of the clamping members;
    wherein the connecting arm is coupled to one of the side plates, the pressing plate is coupled to one end of the side plates away from the fixing plate, and the driving member is positioned between the two side plates.

2. The manipulator gripper as claimed in claim 1, wherein the driving member comprises a main body and a pivot member slidably coupled to the main body, and the connecting rods are pivoted on the pivot member; and
    wherein the two clamping members are capable of rotating relative to the pressing plate, thereby clamping the fixture when driven by the driving member.

3. The manipulator gripper as claimed in claim 1, wherein the suction assembly further comprises a fixing block coupled to the connecting arm, and the at least one suction cup is coupled to the fixing block.

4. The manipulator gripper as claimed in claim 1, wherein the fixing plate comprises a first surface and a second surface, and the two side plates are coupled to the second surface of the fixing plate.

5. The manipulator gripper as claimed in claim 4, wherein the mounting assembly further comprises a connecting member coupled to the two side plates.

6. The manipulator gripper as claimed in claim 4, wherein the manipulator gripper further comprises a connecting terminal and a cover positioned on the first surface of the fixing plate, and the connecting terminal is received in the cover.

7. The manipulator gripper as claimed in claim 1, wherein the suction assembly further comprises a suction driver, the suction driver is mounted on the connecting arm and coupled to the fixing block, and the suction driver is configured to move the at least suction cup toward or away from the connecting arm.

8. The manipulator gripper as claimed in claim 4, wherein the manipulator gripper comprises two suction assemblies, and two connecting arms of the two suction assemblies are coupled to the two side plates.

9. The manipulator gripper as claimed in claim 4, wherein the pressing plate extends perpendicularly to the two connecting arms.

10. A manipulator gripper configured gripping and manipulating workpieces and fixtures, the manipulator gripper comprising:
   a mounting assembly comprising:
      a fixing plate, and
      two side plates extending perpendicularly from opposing sides of the fixing plate;
   two suction assemblies coupled to two sides of the mounting assembly, each of the suction assemblies comprising:
      a connecting arm coupled to one of the side plates; and
      at least one suction cup coupled to the connecting arm and configured for gripping the workpiece by suction; and
   a clamping assembly comprising:
      a pressing plate coupled to the mounting assembly;
      a driving member mounted on the pressing plate;
      two clamping members, one of the clamping members pivoting on a first end of the pressing plate, and the other clamping member pivoting on a second end of the pressing plate, and
      two connecting rods, wherein one end of each connecting rod pivots on the driving member, and the other end of each connecting rod pivots on one of the clamping members.

11. The manipulator gripper as claimed in claim 10,
   wherein the driving member comprises a main body and a pivot member slidably coupled to the main body, and the connecting rods are pivoted on the pivot member; and
   wherein the two clamping members are capable of rotating relative to the pressing plate, thereby clamping the fixture when driven by the driving member.

12. The manipulator gripper as claimed in claim 10, wherein the pressing plate extends perpendicularly to the two connecting arms.

13. The manipulator gripper as claimed in claim 10, wherein each of the suction assemblies further comprises a fixing block coupled to the connecting arm, and the at least one suction cup is coupled to the fixing block.

14. The manipulator gripper as claimed in claim 10, wherein the fixing plate comprises a first surface and a second surface opposing to the first surface, and the two side plates are coupled to the second surface of the fixing plate.

15. The manipulator gripper as claimed in claim 14, wherein the mounting assembly further comprises a connecting member coupled to the two side plates.

16. The manipulator gripper as claimed in claim 14, wherein the manipulator gripper further comprises a connecting terminal and a cover positioned on the first surface of the fixing plate, and the connecting terminal is received in the cover.

17. The manipulator gripper as claimed in claim 10, wherein the pressing plate is coupled to one end of the side plates away from the fixing plate, and the driving member is positioned between the two side plates.

18. The manipulator gripper as claimed in claim 17, wherein the suction assembly further comprises a driving member, the driving member is mounted on the connecting arm and coupled to the fixing block, and the driving member is configured to move the at least suction cup toward or away from the connecting arm.

* * * * *